United States Patent [19]
Cane et al.

[11] Patent Number: 6,101,507
[45] Date of Patent: *Aug. 8, 2000

[54] FILE COMPARISON FOR DATA BACKUP AND FILE SYNCHRONIZATION

[75] Inventors: David Cane, Sudbury; David Hirschman, Sharon; Philip Speare, Arlington; Lev Vaitzblit, Concord; Howard Marson, Needham, all of Mass.

[73] Assignee: Connected Corporation, Framingham, Mass.

[*] Notice: This patent issued on a continued prosecution application filed under 37 CFR 1.53(d), and is subject to the twenty year patent term provisions of 35 U.S.C. 154(a)(2).

[21] Appl. No.: 09/021,705

[22] Filed: Feb. 10, 1998

Related U.S. Application Data

[60] Provisional application No. 60/037,597, Feb. 11, 1997.

[51] Int. Cl.$^7$ .................................................. G06F 17/30
[52] U.S. Cl. ......................... 707/204; 707/203; 707/201; 714/6; 711/162
[58] Field of Search .............................. 707/203, 1, 204, 707/201, 207; 714/6; 711/162

[56] References Cited

U.S. PATENT DOCUMENTS

| | | | |
|---|---|---|---|
| 4,897,785 | 1/1990 | Ziiger | 364/200 |
| 5,210,866 | 5/1993 | Milligan et al. | |
| 5,214,696 | 5/1993 | Keiser et al. | 380/4 |
| 5,263,154 | 11/1993 | Eastridge et al. | 714/6 |
| 5,276,860 | 1/1994 | Fortier et al. | 714/6 |
| 5,276,867 | 1/1994 | Kenley et al. | |
| 5,347,652 | 9/1994 | Epstein et al. | 707/1 |
| 5,428,629 | 6/1995 | Gutman et al. | 371/37.1 |
| 5,438,661 | 8/1995 | Ogawa | 395/157 |
| 5,454,099 | 9/1995 | Myers et al. | 714/6 |
| 5,479,654 | 12/1995 | Squibb | 707/201 |
| 5,628,012 | 5/1997 | Libkin | 707/102 |
| 5,642,496 | 6/1997 | Kanfi | 711/162 |
| 5,647,017 | 7/1997 | Smithies et al. | 382/119 |
| 5,668,897 | 9/1997 | Stolfo | 382/283 |
| 5,720,026 | 2/1998 | Uemura et al. | 714/6 |
| 5,721,907 | 2/1998 | Pyne | 395/610 |
| 5,737,763 | 4/1998 | Hilditch | 711/162 |
| 5,745,906 | 4/1998 | Squibb | 707/203 |
| 5,794,254 | 8/1998 | McClain | 707/204 |
| 5,802,521 | 9/1998 | Ziauddin et al. | 707/7 |
| 5,818,955 | 10/1998 | Smithies et al. | 382/115 |
| 5,848,422 | 12/1998 | Sato et al. | 707/203 |
| 5,881,292 | 3/1999 | Sigal et al. | 395/712 |
| 5,893,113 | 4/1999 | McGrath et al. | 707/200 |
| 5,893,117 | 4/1999 | Wang | 707/203 |
| 5,900,000 | 5/1999 | Korenshtein | 707/200 |
| 5,909,677 | 6/1999 | Broder et al. | 707/3 |

OTHER PUBLICATIONS

A Tutorial on CRC Computations, Aug. 1988, pp 1–14.
Article: Title: A Method For Updating A Cyclic Redundancy Code, Jun. 1992, by Paul R. Lintz.

*Primary Examiner*—Thomas G. Black
*Assistant Examiner*—Jean M. Corrielus
*Attorney, Agent, or Firm*—Weingarten, Schurgin, Gagnebin & Hayes LLP

[57] ABSTRACT

File comparison employs a single function F to calculate a digital signature from data in a sliding window. The digital signature is both incrementally computable and position sensitive. In particular, F is computable without reprocessing each byte in the array when the window is advanced and facilitates detection of such changes as transposed bytes of data. The function F is defined by two qualities. First, for F(A+B), where A is an array, F(A+B)=F(A)+F(B). Second, given a concatenation operator "!" such that "0!A" indicates an array A with 0 inserted before A, the function F has the property that there is a function G such that F(0!A)=G(F(A'0)). Both polynomials and cyclic redundancy checks ("CRC") may be used as that class of function.

17 Claims, 4 Drawing Sheets

FILE COMPARISON FOR DATA BACKUP AND FILE SYNCHRONIZATION

CROSS REFERENCE TO RELATED APPLICATIONS

Priority is claimed to U.S. Provisional patent application Ser. No. 60/037,597 entitled FILE COMPARISON FOR DATA BACKUP AND FILE SYNCHRONIZATION, filed Feb. 11, 1997.

STATEMENT REGARDING FEDERALLY SPONSORED RESEARCH OR DEVELOPMENT

Not Applicable

BACKGROUND OF THE INVENTION

The present invention is generally related to data backup and file synchronization, and more particularly to comparison of sets of digital data to determine differences therebetween to facilitate data backup and file synchronization.

It is desirable to have the facility to copy files present on a first computer system onto a second computer system over a connection. Such a need arises when synchronizing the contents of an "A" disk system on the first computer system with another disk system on the second computer system. Such a need also arises when using a target system to maintain a second copy of a file from a source system for disaster recovery purposes. However, file copying can be cumbersome and time consuming due to the bandwidth limitations of typical connections.

It is known to reduce file copying requirements, and hence more efficiently utilize bandwidth and reduce backup time, by sending only those portions of files which have changed since the last backup to the target system. However, to implement such a system it is necessary to perform data comparison to locate the changed portions.

A file comparison technique is described in U.S. Pat. No. 5,479,654 entitled APPARATUS AND METHOD FOR RECONSTRUCTING A FILE FROM A DIFFERENCE SIGNATURE AND AN ORIGINAL FILE, issued to Squibb. Squibb describes a method of comparing previously stored digital signatures with new digital signatures calculated for data within a sliding window in order to recognize differences between files. In particular, Squibb teaches using two functions to calculate digital signatures. The first function has the attribute of being incremental. The incremental function allows computation of a new digital signature using only the new data entering the window, the old data leaving the window and the old signature, and hence can be calculated relatively quickly. The second function has the attribute of being position sensitive and provides a more unique signature from the data in the window, being sensitive to such changes as transposed bytes.

One combination of functions that Squibb teaches includes an Exclusive-OR ("XOR") function as the incremental function and a Cyclic Redundancy Check ("CRC") function as the position sensitive function. The XOR function of Squibb is incremental, but is not sensitive to such changes as transposed bytes. The CRC function of Squibb is position sensitive, but must include all of the data in the window in the signature calculation. The CRC function of Squibb therefore requires relatively more calculations to compute than the XOR function. In operation the XOR function is employed first. If the comparison between the previously stored signature and the XOR signature indicates a changed data portion then that result is assumed to be correct. If the XOR signature comparison does not indicate a changed data portion then the CRC function is employed to produce a signature that is compared with the previously stored signature. The result from the CRC signature comparison is assumed to be correct. However, a more efficient technique would be desirable.

BRIEF SUMMARY OF THE INVENTION

In accordance with the present invention, a file comparison routine employs a sliding window and a single function F to generate a digital signature that is both position sensitive and incrementally computable. The function F is defined by two qualities. First, for $F(A+B)$, where A is in array, $F(A+B)=F(A)+F(B)$. Second, given a concatenation operator "!" such that "0!A" indicates an array A with 0 inserted before A, the function F has the property that there is a function G such that $F(0!A)=G(F(A!0))$. Both polynomials and cyclic redundancy checks ("CRC") may be employed as the function.

The function F enables computation of a position sensitive digital signature in a single step using only the new data entering the window, the old data leaving the window and the digital signature computed from the previous window. Hence, a file comparison system in accordance with the present invention offers improved performance because relatively fewer calculations are required and a relatively more unique digital signature is provided.

In further accordance with the present invention, previously detected and stored files which have been modified and saved under different file names are detected, and only those portions of the later version of the file which have changed are backed up. To detect such a later version of the already backed up file an "approximate comparison" is made between the file under investigation and the previously stored digital signature lists of other files that have been created on the source system. In one method for approximate comparison a signature is computed for a block of characters in the file under investigation and the signature is compared to previously stored signatures of backed up blocks. The extent of matches is then determined, such as by the number of matching blocks, and the matches are ranked. The previously backed up block corresponding to the highest ranked match is then employed as a baseline for storage of the new file, with only the differing portions of the new file being backed up along with an index to the baseline file.

BRIEF DESCRIPTION OF THE DRAWING

The invention will be more fully understood in view of the Detailed Description of the Invention and the Drawing, of which:

FIG. 7 is a block diagram which illustrates the block filter routine.

DETAILED DESCRIPTION OF THE INVENTION

U.S. Provisional patent application Ser. No. 60/037,597 entitled FILE COMPARISON FOR DATA BACKUP AND FILE SYNCHRONIZATION, filed Feb. 11, 1997 is incorporated herein by reference.

Figure 1:
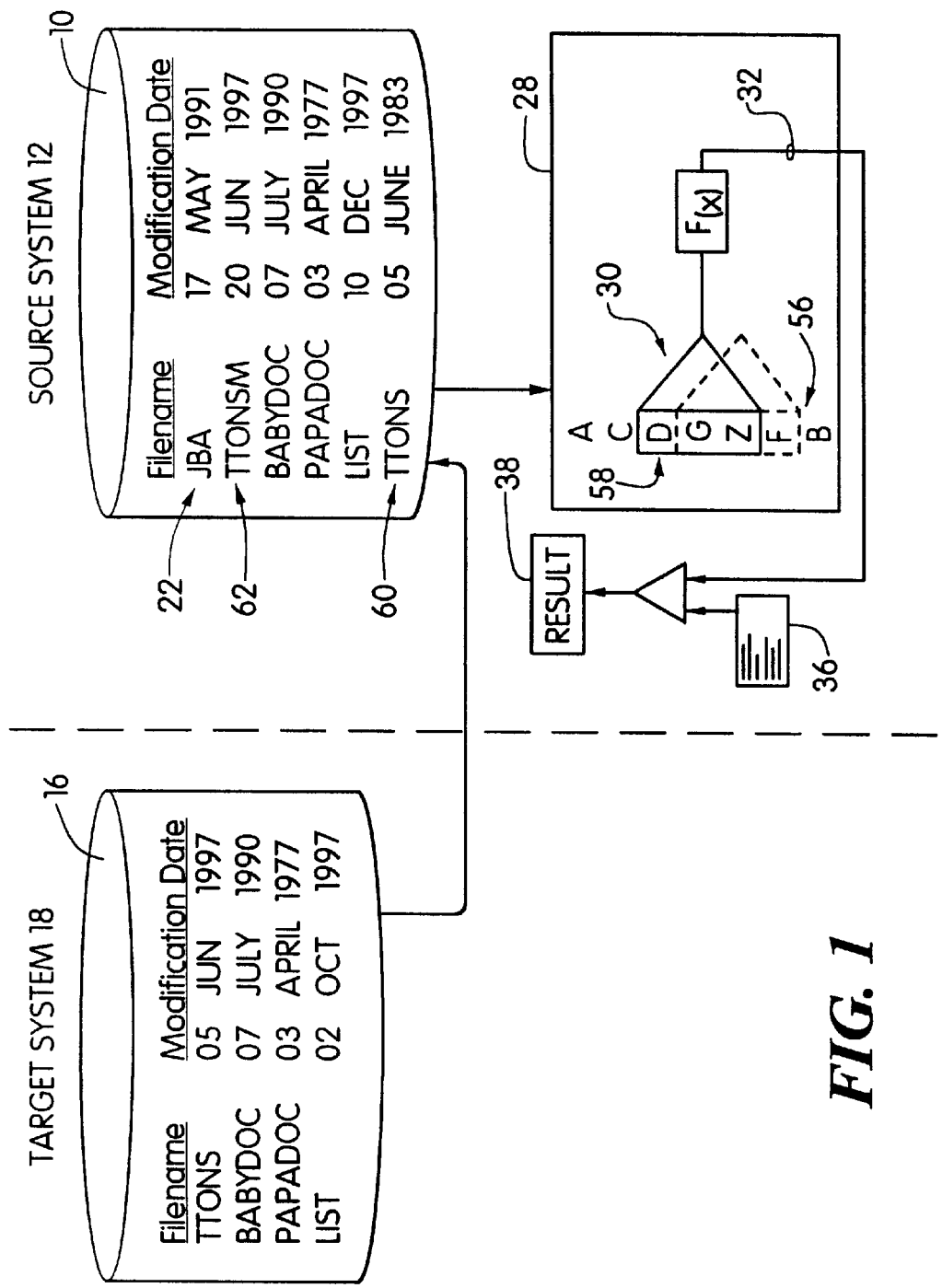
FIG. 1 is a block diagram of a data backup system that employs file comparison.
Figure 2:
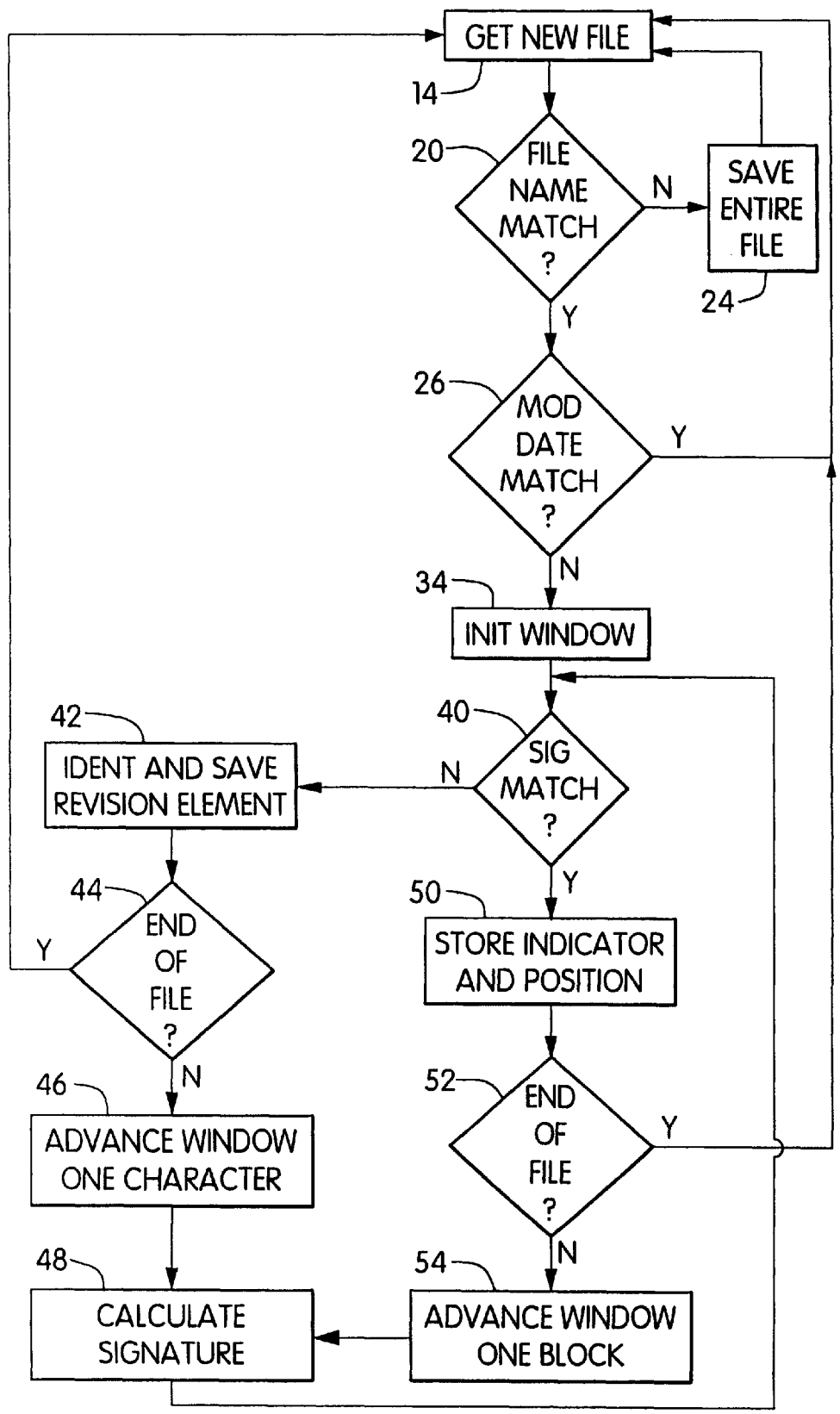
FIG. 2 is a block diagram which illustrates a sliding window comparison method.

Referring to FIGS. 1 and 2, a sliding window comparison technique is employed for data backup and file synchronization. The use of sliding windows and digital signatures for file comparison is known in the art and is taught, inter alia, in U.S. Pat. No. 5,479,654 entitled APPARATUS AND METHOD FOR RECONSTRUCTING A FILE FROM A DIFFERENCE SIGNATURE AND AN ORIGINAL FILE, issued to Squibb, which is incorporated herein by reference. A file is selected from a storage device 10 in a source system 12 as indicated in step 14. The selected file is compared with files on a storage device 16 in a target system 18 by file name as indicated in step 20. As a performance enhancing variation a list of target system files can be maintained on the source system. If no matching file name is located on the target system 18, such as when a new file name 22 is selected in the source system, the entire new file 22 is transmitted from the source system 12 to the target system 18 for backup as indicated in step 24. If a matching file name is located on the target system, the file modification dates associated with the respective matching files are compared as indicated in step 26. Upon locating a previously detected file with an unchanged modification date, no changes in the file are indicated and a new file is loaded as indicated in step 14. Upon locating a previously detected file with a changed modification date, a control program 28 operating in the source system 12 identifies at least one contiguous portion of the file which has changed ("revision element"). The identified revision elements, which may vary in size, are transmitted from the source system to the target system, and may be written into the backup copy of the file or separately backed up.

The control program employs a sliding window 30 to produce digital signatures 32 from block data portions of the file in the source system to identify the revision elements. Each digital signature is a representation of the data characters within the window 30 when the signature is generated. For the first signature generated from a file, the signature is computed by employing all of the data within the window as indicated in step 34. The computed signature 32 is compared with previously stored digital signatures 36 to produce a result 38 that indicates whether there is a match therebetween as indicated in step 40. If a match is not detected then the window position is recorded and the revision element is saved as indicated in step 42. If the end of the file has been reached, as determined in step 44, a new file is selected as indicated in step 14. If the end of the file has not been reached, the window 30 is then advanced by one character as indicated in step 46. A digital signature is then computed as indicated in step 48. The digital signature is compared with the previously stored digital signatures to determine if there is a match therebetween as indicated in step 40. If a match is detected in step 40, a match indicator and the match position are recorded as indicated in step 50. If the end of file has not been reached, as determined in step 52, the window is advanced by the number of characters within the window, e.g., one block, as indicated in step 54. When the entire file has been analyzed, a new file is loaded as indicated in step 14.

Calculation of the digital signature is facilitated by employing any one of a class of functions ("F") that have the property of being both incrementally computable when the window 30 is advanced and providing a position sensitive digital signature 32. For this function, $F(A+B)=F(A)+F(B)$. Further, given a concatenation operator "!" such that "0!A" indicates an array A with a 0 inserted before it, the function F also has the property that there is a function G such that $F(0!A)=G(F(A!0))$. As such, given an array within the window that ends with 0, after shifting each of the bytes therein down by one position and inserting 0 at the beginning of the window, the signature 32 can be computed for this new array from the signature of the old array without reprocessing each of the bytes in the new array. Further, the digital signature produced by the function F is relatively more unique than known incremental functions, and allows detection of such differences as transposed bytes of data within the window. The digital signature is thus "position sensitive."

The use of the function F provides improved performance in the file comparison system by reducing the number of calculations required to detect differences between sets of data such as files. The function enables computation of a position sensitive digital signature in a single step using only the new data 56 entering the window, the old data 58 leaving the window and the digital signature computed from the previous window. Hence, the performance is improved because relatively fewer calculations are required and a relatively more unique digital signature is provided.

In one embodiment the function F is the polynomial: $F(A_n)=\text{Sum }(a_{i+n}{}^*3^{(w-1-i)})$ modulo $2^{64}$ for i=0 to w−1, for an array A starting at index position n with a window size of w, where $a_i$ is an element of A. If the window is advanced in A, then the new function is computed as follows: $F(A_{n+1})=3^*F(A_n)-a_n{}^*3^{w-1}+a_{n+w}$ modulo $2^{64}$. Computing the new function is generally faster than computing the original $F(A_n)$. Hence, file comparison is facilitated by use of this function.

In view of the present disclosure it will now be appreciated by those skilled in the art that functions other than the function illustrated in the above embodiment will provide digital signatures that are both incrementally computable and position sensitive. For example, the general class of functions known as Cyclic Redundancy Check ("CRC") functions, which are polynomials over GF(2), are incremental functions and will provide position sensitive digital signatures.

Detection of Similar Files

Figure 3:
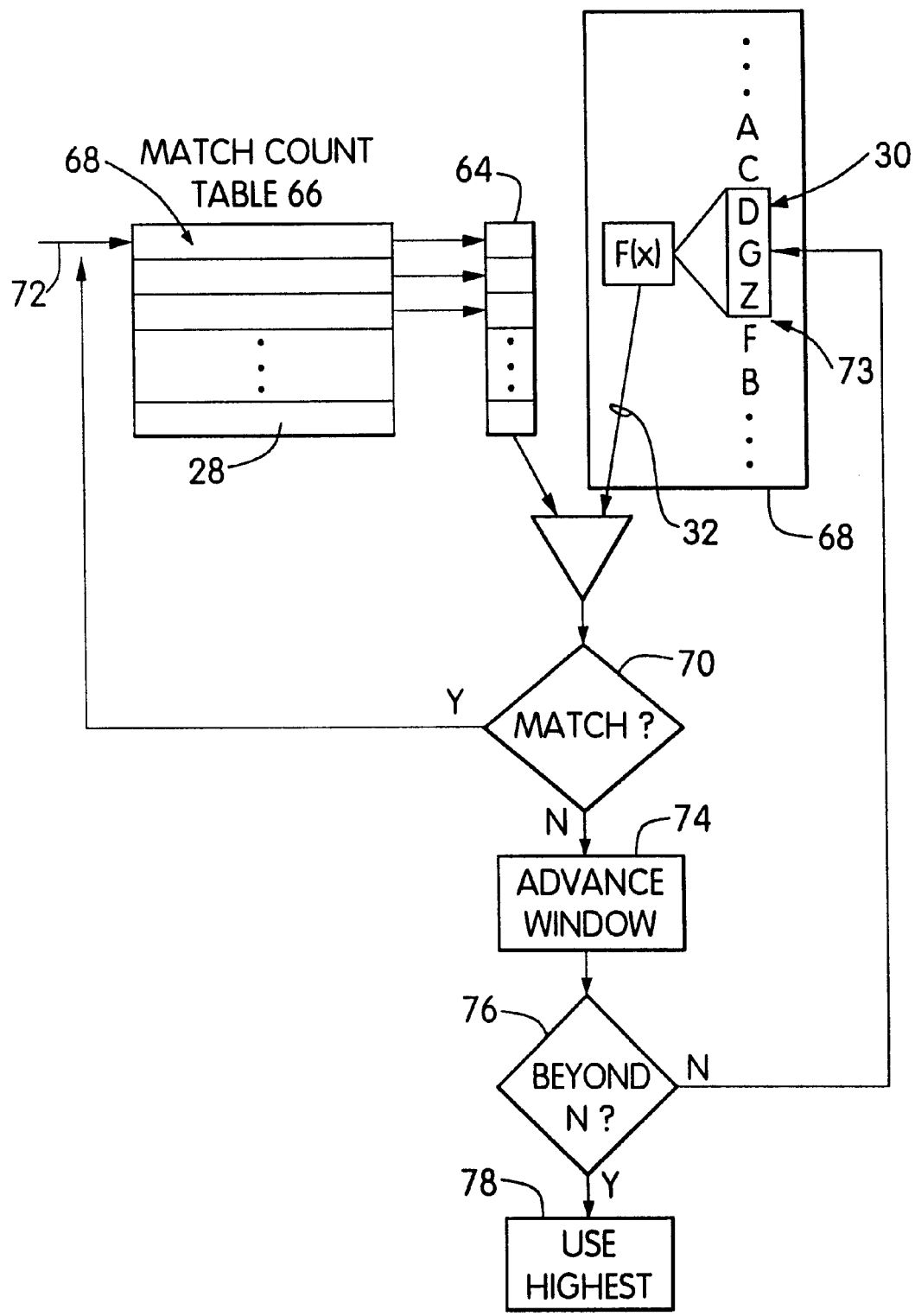
FIG. 3 is a block diagram which illustrates approximate comparison of files.
Figure 4:
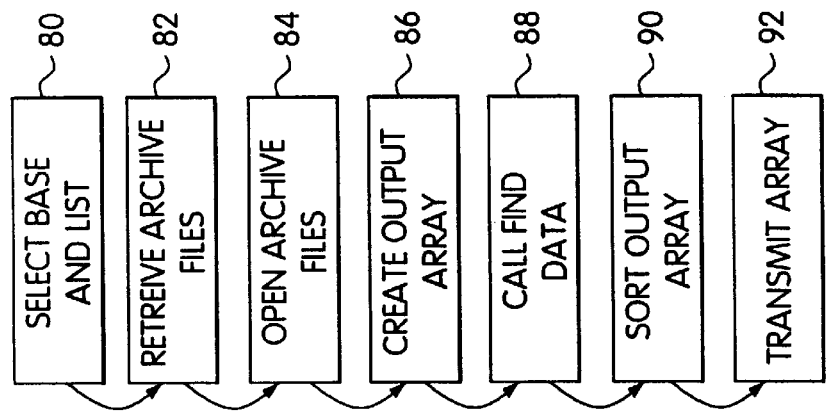
FIGS. 4–6 illustrate how compression and encryption affect backup and recovery.
Figure 4:
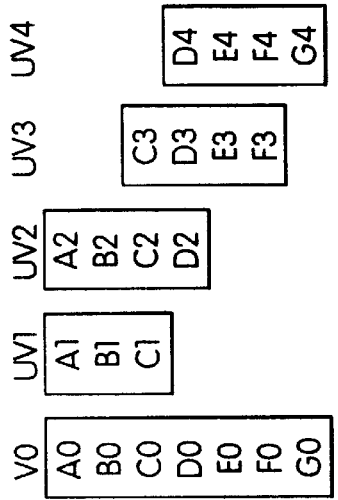

Referring now to FIGS. 1 and 3, in a first alternative embodiment the file comparison technique is employed to detect similar files having different filenames in order to further facilitate backup operations. When a previously detected file, such as a form letter 60, is modified and subsequently saved under a different file name, the new version 62 of the file is detected and only the revision elements of that new version are saved. To detect the new version of the file an "approximate comparison" is made between the new file and the previously stored digital signatures from the other files that have been created on the source system. The approximate comparison detects files that are similar, although not necessarily identical to, the new version of the file.

In one approximate comparison technique the control program maintains a list 64 of signatures for all source system files that have previously been backed up to the target system. A Match Count Table 66 is created with one row 68 for each file in the list of signatures. Each row in the Match Count Table is initialized to zero. The window 30 for signature computation in the new file is then positioned at the beginning of the file being examined.

In an initial step 68 a signature 32 for the characters in the window 30 is computed with the function F. The computed signature is then compared against all of the signatures for the first "N" blocks of previously copied files in the list 64, where N is a predetermined integer value. If a match against at least one existing block signature is detected as indicated in step 70, then the row pointer 72 in the Match Count Table is incremented and the window 30 in the new file is moved to begin at the end 73 of the block for which the signature was just computed. If no match is detected at step 70 then the window 30 is advanced by one character as indicated in step 74. If comparison has not advanced beyond the first N blocks for the new file as determined in step 76, flow returns to step 68. Otherwise flow continues to step 78. As indicated in step 78, the file with the highest count in the Match Count Table is selected and a comparison algorithm is used to determine the set of changes between this file and the new file. The set of changes is then backed up along with a pointer to the original backup of the file. In the event of equal counts resulting in "ties" in the Match Count Table one of the files is arbitrarily selected.

Restore Optimization

Referring to FIGS. 1 and 4–7, in a second alternative embodiment, restoration of revision elements is facilitated by a filter routine when compression and encryption are employed. The filter routine controls the encryption and compression engines on the source system. When the detected revision elements are compressed and encrypted for transmission to the target system, the compression and encryption engine is restarted with each revision element so that the target system can assemble a representation of the final file for transmission to the source system without decrypting the revision elements. Hence, it is not necessary for the target system to have knowledge of the encryption key or compression algorithm.

Figure 5:
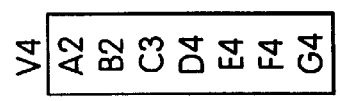

Performance is further facilitated in the case where a plurality of relatively small revision elements are present by combining the small revision elements together and compressing the collection of revision elements in a single step. In particular, the compression engine is not restarted at each revision element, so the compression algorithm has a larger array to work on and hence is more efficient. The problems posed for this technique when encryption is employed are evident in FIG. 4, which shows version 0 ("V0") of the file, consisting of 7 blocks, and the revision elements for V1 through V4. FIG. 5 shows the complete contents of V4. If a request for the restoration of V4 is made, and the target system cannot take the revision elements apart because they are all encrypted together, then the best transmission that can be made is to send a total of V0 (7 blocks), UV2 (4 blocks), UV3 (4 blocks), UV4 (4 blocks) for a total of 19 blocks to restore a 7 block long file. UV1 is unnecessary because everything in it has been replaced by later revision elements.

Figure 6:
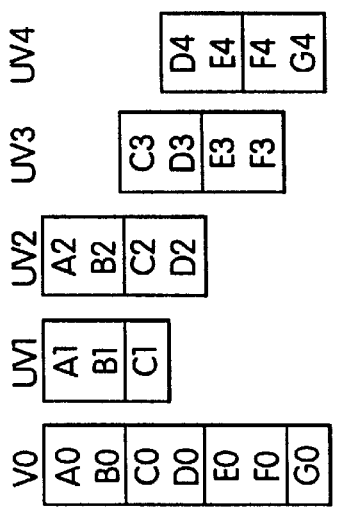

Referring now to FIG. 6, an original backup and revision elements generated from updates are grouped for compression and encryption. Not all of the updates for a single version are packed together. Rather, the updates are grouped together into units of compression ("chunks"). The optimal set of chunks to be returned in the illustrated example is: A2B2, C3D3, D4E4, F4G4, whereby only eight blocks are sent for a seven block file, rather than nineteen blocks as in the previously described technique. However, in practice the updates will not always align perfectly and may have arbitrary overlaps.

File restoration is further illustrated by Tables 1–11. A file to be restored is stored in the archive system as a series of updates and an archive. The archive contains all of the bytes of the file. The updates contain file change information that can be employed to update the previous version of the file to the current version. The update algorithm works by creating a list of updates that encompasses all of the bytes of the file.

The algorithm first processes the most recent update and then works sequentially backwards through the set of updates, so that if a given byte of the file is already covered by an update, the algorithm will not employ an older update that contains that same byte.

TABLE 1

| Addr | V0 | V1 | V2 | V3 |
|------|----|----|----|----|
| 0 | A | A | L | P |
| 1 | B | L | Q | Q |
| 2 | C | Q | D | D |
| 3 | D | D | E | E |
| 4 | E | E | M | F |
| 5 | F | M | F | N |
| 6 | G | F | N | H |
| 7 | H | G | H | I |
| 8 | I | H | I | J |
| 9 | J | I | J | |
| 10 | | J | | |

Table 1 illustrates four versions of an example file. File version V1 differs from version V0 in two places. In particular, version V1 replaced two bytes at address 1 and inserted a byte at address 5. The update for V1 is coded as follows:

TABLE 2

| Operation | Data Offset | Length | Target | Contents |
|-----------|-------------|--------|--------|----------|
| Copy | 0 | 1 | 0 | |
| Data | | 2 | 1 | LQ |
| Copy | 3 | 2 | 3 | |
| Data | | 1 | 5 | M |
| Copy | 5 | 5 | 6 | |

The update expressed in Table 2 is interpreted as:

1. Copy 1 byte from the previous file (A) at address 0 to address 0 of the new version (Target) of the file.

2. Place 2 bytes of newly supplied data (LQ) into the new file starting at address 1.

3. Copy 2 bytes from the previous file (DE) at address 3 to address 3 of the new file.

4. Place 1 byte of newly supplied data (M) into the new file at address 5.

5. Copy 5 bytes from the previous file (FGHIJ) to address 6 of new file.

Given the above described coding method, the other three versions of the updates shown in Table 1 are coded as shown in Tables 3–5 below.

TABLE 3

| Operation | Data Offset | Length | Target | Contents |
|-----------|-------------|--------|--------|----------|
| Data | | 3 | 0 | ABC |
| Data | | 3 | 3 | DEF |
| Data | | 4 | 6 | GHIJ |

TABLE 4

| Operation | Data Offset | Length | Target | Contents |
|-----------|-------------|--------|--------|----------|
| Copy | 1 | 6 | 0 | |
| Data | | 1 | 6 | N |
| Copy | 8 | 3 | 7 | |

TABLE 5

| Operation | Data Offset | Length | Target | Contents |
|---|---|---|---|---|
| Data |   | 1 | 0 | P |
| Copy | 1 | 3 | 1 |   |
| Copy | 5 | 5 | 4 |   |

A block filter algorithm may be employed to facilitate restoration of a desired version of a file. When multiple updates for a file have been archived, intermediate updates may be overwritten by later updates. The block filter algorithm is employed to recognize such situations and avoid needless computation. The Block Filter Algorithm determines an optimal set of updates. For example, providing file version V3 via the block filter algorithm includes creating an Update List of all of the version archives, ordered by version with the most recent at the head of the list. An empty output file and an empty GetData list are then created. The empty GetData list is a list of records that describes the data that is needed from each archive to create the output file. Entries are added to the end of the list and removed from the head of the list. Each record has the following four fields:

Version: the archive version to get the data from

Source Offset: the location within the archive file to get the data from

Length: the length of the data to be copied in this operation

Target: the location in the output file that this data will go to

The following entry is placed at the head of the GetData list:

Version=most recent version of the file to be retrieved

Source Offset=0

Length=length of output file

Target=0

The GetData list is processed by initially removing an entry from the head of the list. The entries in the Update List for the specified version are then searched to locate a record in the Update List whose source range overlaps the target range of the GetData entry being processed. "Overlap" indicates that some portion of the range defined by Data Offset+Length defined in the GetData entry overlaps the range defined by the Target+Length in the UpdateList. If the record found in the Update List is a "Data" record, then the data is copied from that record to the output file. If the record found in the Update List is a "Copy" record, then a new record is added to the end of the GetData list with the version entry decremented. Processing of the GetData entry continues by scanning the Update List entries until the entire target range of the GetData entry has been covered with either Data or Copy entries from the Update List. Flow then return to the initial step at which processing of the next entry from the GetData list begins.

Exemplary block filter algorithm execution steps are shown in Tables 5–8. Entry 1 in the GetData List shows a source range of 0–8 and a Version of 3. The Update List is searched for a Version 3 entry with a matching output range. The first such entry is Entry 1. This specifies Data with a length of 1 (P) and it is placed in the output file and location 0, the target location. Entry 1 in the GetData List has been satisfied for source location 0, leaving source locations 1–8 to be satisfied. Entry 1 in the GetData List is processed for a source range of 1–8. A match is found in Update List entry. This is a copy operation, so an entry is added to the GetData List (entry 2) that specifies Version 2, the next lower version, and spans the range of overlap from GetData entry 1 and Update List entry 2, namely 1–3. Entry 1 of the GetData List is then processed for source locations 4–8. This match is found with Update List item 3, a copy operation. GetData entry 3 is added. This satisfies the entire range of Entry 1 from the GetData List. Entry 2 in the GetData List shows a source range of 1–3 and a Version of 2. The Update List is searched for a Version 2 entry with an output range matching this. Such an entry is found at Update List (4). This is a copy operation so a new entry (4) is placed in the GetData List. Note that because a source range of 1–3 was sought, and the output range from the Update List entry was 0–5, the entry is made into the GetData List, the Data Offset range and Length are adjusted to capture only the piece of Update List entry 4 to reflect what was needed by the GetData List entry 2. Entry 2 from GetData is then completely satisfied. Entry 3 from GetData shows a source range of 5–9. The first location of this range is matched by Update List(4), which is a copy operation and results in a new entry to GetData(5). This leaves GetData(3) with a source range of 6–9 to be processed. The GetData(3) source range of 6 is matched by Update List(5) which is a Data operation. The data (N) is copied to the output file at location 5. This is because the GetData(3) entry has a source range of 5–9 which maps to an output range of 4–8. Hence the source item at location 6, gets placed in the output file at location 5. The GetData(3) source range 7–9 is next found to match Update(6), a copy operation. This yields GetData(6). The remaining items in the GetData list are processed in a similar manner until the list is empty. This will yield the complete output file, without ever having to process entries from the update list Data items that did not affect the final output file.

|   | Version | Operation | Data | Length | Target | Contents | Output Range |
|---|---|---|---|---|---|---|---|
| 1 | 3 | Data |   | 1 | 0 | P | 0 |
| 2 | 3 | Copy | 1 | 3 | 1 |   | 1–3 |
| 3 | 3 | Copy | 5 | 5 | 4 |   | 4–8 |
| 4 | 2 | Copy | 1 | 6 | 0 |   | 0–5 |
| 5 | 2 | Data |   | 1 | 6 | N | 6 |
| 6 | 2 | Copy | 8 | 3 | 7 |   | 7–9 |
| 7 | 1 | Copy | 0 | 1 | 0 |   | 0 |
| 8 | 1 | Data |   | 2 | 1 | LQ | 1–2 |
| 9 | 1 | Copy | 3 | 2 | 3 |   | 3–4 |
| 10 | 1 | Data |   | 1 | 5 | M | 5 |
| 11 | 1 | Copy | 5 | 5 | 6 |   | 6–10 |
| 12 | 0 | Data |   | 3 | 0 | ABC | 0–2 |
| 13 | 0 | Data |   | 3 | 3 | DEF | 3–5 |
| 14 | 0 | Data |   | 4 | 6 | GHIJ | 6–9 |

TABLE 6           TABLE 6a

TABLE 7

| | GetData | | |
|---|---|---|---|
| Version | Data Offset | Length | Target |
| 1 | 3 | 0 | 9 | 0 |
| 2 | 2 | 1 | 3 | 1 |
| 3 | 2 | 5 | 5 | 4 |
| 4 | 1 | 2 | 3 | 1 |
| 5 | 1 | 6 | 1 | 4 |
| 6 | 1 | 8 | 3 | 6 |
| 7 | 0 | 3 | 2 | 2 |
| 8 | 0 | 5 | 1 | 4 |
| 9 | 0 | 8 | 3 | 6 |

TABLE 7a

| Source | Ouput Range | From GetData | From Update |
|--------|-------------|--------------|-------------|
| 1 | 0-8 | 0–8 | |
| 2 | 1-3 | 1–3 | 1 | 2 |
| 3 | 5-9 | 4–8 | 1 | 3 |
| 4 | 2-4 | 1–3 | 2 | 4 |
| 5 | 6 | 4 | 3 | 4 |
| 6 | 8-10 | 6–8 | 3 | 6 |
| 7 | 3-4 | 2–3 | 4 | 9 |
| 8 | 5 | 4 | 5 | 11 |
| 9 | 7-9 | 6–8 | 6 | 11 |

TABLE 8

Output File

| Address | Contents | From GetData List | From Update List |
|---------|----------|-------------------|------------------|
| 0 | P | 1 | 1 |
| 1 | Q | 4 | 8 |
| 2 | D | 7 | 13 |
| 3 | E | 7 | 13 |
| 4 | F | 8 | 13 |
| 5 | N | 3 | 5 |
| 6 | H | 9 | 14 |
| 7 | I | 9 | 14 |
| 8 | J | 9 | 14 |

Having described the preferred embodiments of the invention, other embodiments which incorporate the concepts of the invention will now become apparent to one of skill in the art. Therefore, the invention should not be viewed as limited to the disclosed embodiments but rather should viewed as limited only by the spirit and scope of the appended claims.

What is claimed is:

1. A system for comparing a first data set on a first storage device with a second data set on a second storage device, comprising:

a transmission medium for transmitting data between the first storage device and the second storage device;

a control program that generates a first digital signature from the first data set and a second digital signature from the second data set, the control program including a function F that incrementally calculates position sensitive first and second digital signatures, wherein said first data set is defined by a sliding indexed window and said incremental calculation comprises data leaving the window, data entering the window, and a previous digital signature; and a comparator for determining whether the first digital signature matches the second digital signature.

2. The comparing system of claim 1 wherein polynomials are used to implement the function F.

3. The comparing system of claim 2 wherein the function F is a polynomial: $F(A_n)=\text{Sum } (a_{i+n}{}^*N^{(w-1-i)})$ modulo $2^{64}$ for i=0 to w−1, for an array A starting at index position n with a window size of w, where $a_i$ is an element of A.

4. The comparing system of claim 3 wherein, if the window is advanced in A, then a new function is computed as:

$F(A_{n=1})=N^*F(A_n)-a_n{}^*N^{w-1}+a_{n+w}$ modulo $2^{64}$.

5. The comparing system of claim 1 wherein a cyclic redundancy check is used to implement the function F.

6. A method for calculating a position sensitive digital signature from data on a first storage medium for comparison with a digital signature that represents data on a second storage medium, comprising the steps of:

selecting the data in the first system with an indexed sliding window;

applying a function F to the data within the window to generate the incremental position sensitive digital signature, wherein said function of F comprises input from data leaving said sliding indexed window, data entering said sliding indexed window, and a previously generated digital signature; and comparing the position sensitive digital signature with at least one digital signature representing data in the second system.

7. The method of claim 6 including the further step of employing a polynomials to implement the function F.

8. The method of claim 7 including the further step of employing the function: $F(A_n)=\text{Sum } (a_{i+n}{}^*N^{(w-1-i)})$ modulo $2^{64}$ for i=0 to w−1, for an array A starting at index position n with a window size of w, where $a_i$ is an element of A, to implement the function F.

9. The method of claim 8 including the further step of, if the window is advanced in A, computing a new position sensitive digital signature as: $F(A_{n=1})=N^*F(A_n)-a_n{}^*N^{w-1}+a_{n+w}$ module $2^{64}$.

10. The method of claim 6 including the further step of employing a cyclic redundancy check to implement the function F.

11. A method for providing an incremental backup of a first memory in a second memory wherein a set of different files have previously been stored in the second memory, comprising the steps of:

selecting a file from the first memory for examination;

generating a signature from a portion of the file defined by a sliding indexed window;

comparing the generated signature with signatures generated from the set of previously stored files having different filenames;

determining the closest matching previously stored file, relative to the file under examination, where the stored file and the file under examination have different filenames, by identifying at least some portions of the stored file and the file under examination which are different, wherein said determining comprises applying a function F to the data within said sliding indexed window to generate an incremental position sensitive digital signature, wherein said function of F comprises input from data leaving said sliding indexed window, data entering said sliding indexed window, and a previously generated digital signature; and storing the portions of the file under examination identified as being different from the closest matching file in the second memory.

12. The method of claim 11 including the further step of creating a match count table with a row corresponding to each respective previously stored file.

13. The method of claim 12 including the further step of comparing the generated signature with signatures generated for N blocks of the previously stored files, where N is a predetermined integer.

14. A method for determining a minimum set of data compression units for restoring a file from a base copy and a plurality of revision elements, comprising the steps of:

selecting the base copy and revision elements required to build the file;

sorting the selected base copy and revision elements into a list with the most recently generated revision element at the list head and the base copy at the list tail;

reading information for each selected revision element into an array with five columns: chunk, operation, data offset, data length, and target offset;

creating an output array indicative of the reconstructed file with five columns: revision element pointer, chunk, data offset, data length, and target offset;

calling a recursive function for the most recent revision, requesting data offset 0 and the final file length, and passing in target offset 0, the recursive function iterating through the array columns and comparing the requested data offset and length with the target of offset and data length of each item, and in the case of a match, writing an entry into the output array if the array item is a data operation;

optimizing, via a block filter, an optimal set of array elements wherein elements not affecting said output array are ignored; and sorting the output array by revision element and chunk; and transmitting the array followed by the transmission blocks for each data block.

15. The method of claim 14 wherein the recursive function operates by iterating through the array items, and comparing the requested data offset and length with the target offset and data length of each item.

16. The method of claim 15 wherein, if a match or partial match is found, either writing an entry into the output array item or calling the recursive function again for the next list element with the offset equal to the item's data offset minus the target offset of each item plus the requested data offset, and the length equal to the remaining requested length and the item length.

17. The method of claim 16 wherein, if a partial match was found, incrementing the requested data offset and target offset and decrementing the requested length and continuing to iterate.

* * * * *

UNITED STATES PATENT AND TRADEMARK OFFICE
CERTIFICATE OF CORRECTION

PATENT NO. : 6,101,507
DATED : August 8, 2000
INVENTOR(S) : David Cane et al.

It is certified that error appears in the above-identified patent and that said Letters Patent is hereby corrected as shown below:

Title page,
Item [57] ABSTRACT, line 12, "(A'0))." should read -- (A!0)) . --;

Column 6,
Table 3,

TABLE 3

| Operation | Data Offset | Length | Target | Contents |
|---|---|---|---|---|
| Data | | 3 | 0 | ABC |
| Data | | 3 | 3 | DEF |
| Data | | 4 | 6 | GHIJ | should read,

V0

| Operation | Data Offset | Length | Target | Contents |
|---|---|---|---|---|
| Data | | 3 | 0 | ABC |
| Data | | 3 | 3 | DEF |
| Data | | 4 | 6 | GHIJ |

Table 3

Table 4,

TABLE 4

| Operation | Data Offset | Length | Target | Contents |
|---|---|---|---|---|
| Copy | 1 | 6 | 0 | |
| Data | | 1 | 6 | N |
| Copy | 8 | 3 | 7 | |

UNITED STATES PATENT AND TRADEMARK OFFICE
CERTIFICATE OF CORRECTION

PATENT NO. : 6,101,507
DATED : August 8, 2000
INVENTOR(S) : David Cane et al.

It is certified that error appears in the above-identified patent and that said Letters Patent is hereby corrected as shown below:

should read,

V2

| Operation | Data Offset | Length | Target | Contents |
|---|---|---|---|---|
| Copy | 1 | 6 | 0 | |
| Data | | 1 | 6 | N |
| Copy | 8 | 3 | 7 | |

Table 4

Column 7,
Table 5,

TABLE 5

| Operation | Data Offset | Length | Target | Contents |
|---|---|---|---|---|
| Data | | 1 | 0 | P |
| Copy | 1 | 3 | 1 | |
| Copy | 5 | 5 | 4 | | should read,

V3

| Operation | Data Offset | Length | Target | Contents |
|---|---|---|---|---|
| Data | | 1 | 0 | P |
| Copy | 1 | 3 | 1 | |
| Copy | 5 | 5 | 4 | |

Table 5

UNITED STATES PATENT AND TRADEMARK OFFICE
CERTIFICATE OF CORRECTION

PATENT NO.    : 6,101,507
DATED         : August 8, 2000
INVENTOR(S)   : David Cane et al.

It is certified that error appears in the above-identified patent and that said Letters Patent is hereby corrected as shown below:

Column 8,
Line 35, insert -- Updated List -- above table; and

Column 10,
Line 23, "module" should read -- modulo --.

Signed and Sealed this

Twenty-sixth Day of March, 2002

Attest:

JAMES E. ROGAN
Attesting Officer

Director of the United States Patent and Trademark Office